United States Patent [19]

Braatz et al.

[11] Patent Number: 4,881,110
[45] Date of Patent: Nov. 14, 1989

[54] DOUBLE-SCHOTTKY DIODE LIQUID CRYSTAL LIGHT VALVE

[75] Inventors: Paul O. Braatz, Canoga Park; Uzi Efron, Los Angeles, both of Calif.

[73] Assignee: Hughes Aircraft Company, Los Angeles, Calif.

[21] Appl. No.: 194,352

[22] Filed: May 16, 1988

Related U.S. Application Data

[62] Division of Ser. No. 758,917, Jul. 25, 1985, Pat. No. 4,842,376.

[51] Int. Cl.$^4$ .................. G02F 1/135; H01L 29/48; H01L 27/14
[52] U.S. Cl. .......................... 357/30; 357/15; 350/342
[58] Field of Search ............. 350/342; 357/15, 15 M, 357/32, 33, 30 L

[56] References Cited

U.S. PATENT DOCUMENTS

| 2,669,635 | 2/1954 | Pfann | 357/33 X |
| 3,053,926 | 9/1962 | Ben-Sira et al. | 357/32 X |
| 3,968,272 | 7/1976 | Anand | 357/15 X |
| 4,005,468 | 1/1977 | Tanimura et al. | 357/32 X |
| 4,056,642 | 11/1977 | Saxena et al. | 357/15 X |
| 4,206,979 | 6/1980 | Jost | 350/342 |
| 4,228,449 | 10/1980 | Braatz | 350/342 X |
| 4,239,348 | 12/1980 | Grinberg et al. | 350/342 |

FOREIGN PATENT DOCUMENTS

| 2227547 | 11/1974 | France | 350/342 |
| 0027940 | 9/1970 | Japan | 357/15 M |

OTHER PUBLICATIONS

Fink et al., Editor, *Electronics Engineer's Handbook*, McGraw-Hill Book Co., pp. 7-40, 7-41, 8-38, 9-66, 1982.
IBM Tech. Disc. Bull., "Light Activated Liquid Crystal Light Valve for Projection Displays", vol. 28, No. 4, Sep. 1985, pp. 1664–1665.
Jost, "A New Light Modulated Liquid Crystal Light Valve", J. Appl. Phys., vol. 49, No. 10, Oct. 1978, pp. 5332–5333.
Efron et al., "A Silicon Photoconductor Based Liquid Crystal Light Valve", p. 142, SID 81 Digest (1981).

*Primary Examiner*—Stanley D. Miller
*Assistant Examiner*—Napoleon Thantu
*Attorney, Agent, or Firm*—V. D. Duraiswamy; W. K. Denson-Low

[57] ABSTRACT

A double Schottky diode light valve (5) includes a liquid crystal (80) for locally modulating a beam (120) by polarization rotation to produce a modulated beam (121), and a photoconductor (40) located adjacent the liquid crystal (80) for receiving and absorbing a second beam (110). The photoconductor (40) controls the polarization responsively to the optical content of the second beam (110). The photoconductor (46) includes a semiconductor substrate and a pair of Schottky diodes (60/40, 30/40) disposed on opposing sides of the substrate. The absorption of the second beam (110) by the substrate (40) produces photogenerated carriers. The pair of Schottky diodes (60/40, 30/40) maintain the substrate (40) substantially depleted of such carriers and also reflects the modulated beam back through the liquid crystal.

6 Claims, 1 Drawing Sheet

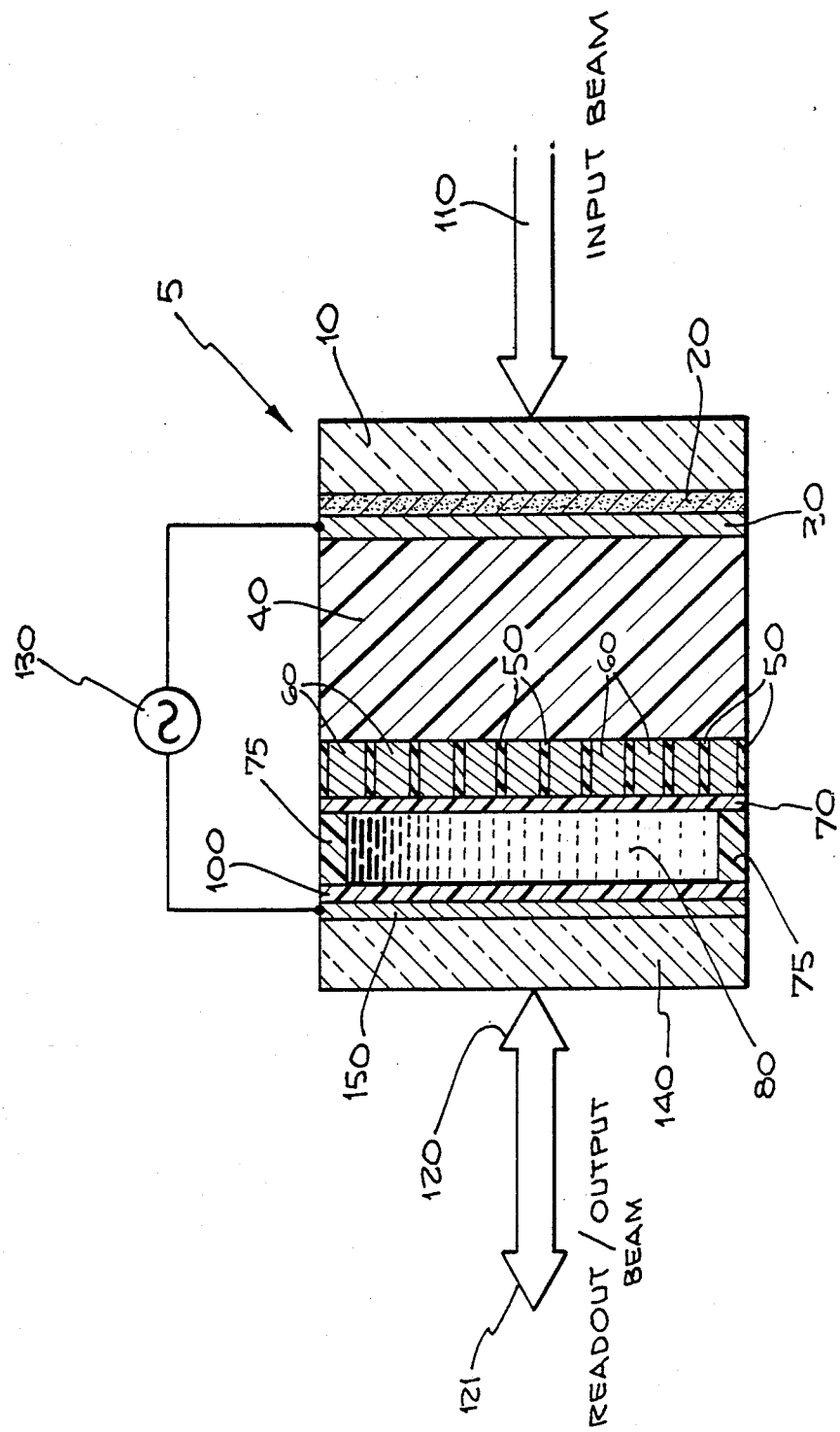

DOUBLE-SCHOTTKY DIODE LIQUID CRYSTAL LIGHT VALVE

This is a division of application Ser. No. 758,917, filed Jul. 25, 1985, U.S. Pat. No. 4,842,376.

BACKGROUND OF THE INVENTION

The present invention relates generally to light valves, and, in particular, to high performance photoconductive substrates for use in light valves.

Liquid crystal-based "light valves" or spatial light modulators have found wide application in the fields of image processing, image conversion, and realtime data processing. Light valves have been used, for example, to perform visible to visible image processing, and also to perform image conversion between the visible and infrared spectra. Light valves are finding increasing use in the field of adaptive optics, such as for example, to modify the optical properties of laser beams.

The development of and-and theory underlying light valve technology is illustrated in such patents as U.S. Pat. No. 3,824,002, issued to T. D. Beard on July 16, 1974 and U.S. Pat. No. 4,019,807, issued to D. D. Boswell on Apr. 26, 1977. The basic design of the alternating current (AC) light valve is shown in the Beard patent. An example of a light valve configured to perform visible to infrared image conversion is set forth in U.S. Pat. No. 4,114,991, issued to W. T. Bleha on Sept. 9, 1978. The configuration and operation of the light valve in the hybrid field effect mode, which accomplishes the polarization rotation necessary to effect modulation of an image is discussed in the Boswell patent, as well as in U.S. Pat. No. 4,378,955, issued to W. T. Bleha on Apr. 5, 1983. All of the foregoing patents are owned by the assignee of the present invention.

As discussed in the foregoing patents, the important elements of a light valve are the liquid crystal and the photoconductive substrate. The photoconductive substrate receives the incoming image and controls the polarization rotation of the liquid crystal responsively thereto to accomplish the image conversion or modulation. Prior art light values, such as those shown in U.S. Pat. Nos. 4,019,807, 4,114,991, as well as in 4,018,509, issued to D. D. Boswell, et al. on Apr. 19, 1977, 4,239,348, issued to Jan Grinberg, et al. on Dec. 16, 1980, and 4,443,064, issued to Jan Grinberg, et al. on Apr. 17, 1984 have typically employed cadmium sulfide or metal oxide semiconductor (MOS)-based photoconductive elements. Simple low-resistivity Schottky silicon structures have also been employed.

These prior photoconductive substrates have several inherent disadvantages. In particular, the previous cadmium sulfide photoconductor structure was based on a polycrystalline (thin-film) photosubstrate which suffered from slow transient response, low sensitivity, non-reproducibility, and non-uniformity.

The prior MOS substrate configuration was limited by premature collapse of the depletion region, the creation of laterally conductive inversion layers which degraded spatial resolution, the use of lattice-damaging processing steps (ion-implantation and thermal oxide growth), and the difficulty associated with flattening a thin processed silicon wafer.

Likewise, the prior Schottky diode-base photosubstrates precluded operation in a symmetrical AC mode. The prior Schottky configuration resulted in the liquid crystal being subjected to direct current, which resulted in electrochemcial degradation of this important layer.

Eliminating the foregoing limitations with the prior art photosubstrates would result in a higher performance light valve. Simplifying the processing of the light valve would also result in a more reliable and economical light valve. Any solution to the foregoing problems with the prior art photosubstrates must, however, maintain the light valve operating in a AC mode, to eliminate the problems caused by DC operation of the liquid crystal.

Accordingly, it is the principal purpose of the present invention to achieve higher performance in a light valve, in terms of improved output uniformity, higher resolution, and higher yield.

It is another purpose of the present invention to simplify the fabrication of light valves.

Yet another purpose of the present invention is to achieve a high performance light valve capable of image processing and conversion in the visible spectral range, as well as between the infrared and visible spectral ranges.

SUMMARY OF THE INVENTION

The present invention, in a broad aspect, is a double-Schottky diode light valve having a liquid crystal for locally modulating a beam by polarization rotation to produce a modulated beam and also having a photoconductor, with two Schottky diodes disposed on opposite sides, for receiving and absorbing a second beam and for controlling the polarization rotation of the first beam responsively to the optical content of the second beam. The pair of Schottky diodes maintain the substrate substantially depleted of the photogenerated majority carriers which are produced by the absorption of the second beam. One of the Schottky diodes also reflects the modulated beam back through the liquid crystal, such that the modulated beam passes through the liquid crystal twice and is polarization rotated on each passage in proportion to the optical information in the second beam.

In accordance with one feature of the invention, the substrate can be a high resistivity silicon substrate or a substrate of gallium arsenide or indium arsenide.

In accordance with another feature of the invention, one of the Schottky diodes is disposed on the side of the photoconductor opposite the liquid crystal and in optical communication with the second beam. The diode includes an optically transparent layer of metal adjacent the substrate such that a metal-semiconductor diode is formed by the layer and the substrate. The metals which can be used include indium tin oxide, adjacent layers of platinum and indium tin oxide, or any metal forming a high Schottky barrier with the substrate. This Schottky diode may also be a plurality of metal-semiconductor diodes formed between the substrate and a metallic grid adjacent the substrate.

In accordance with a further feature of the invention, the second Schottky diode is disposed on the side of the photoconductor adjacent the liquid crystal and is oriented to reflect the modulated beam back through the liquid crystal. The second diode includes a plurality of metal-semiconductor diodes formed by a metallic grid adjacent to the substrate. The metallic grid can comprise an oxide etched to form a plurality of generally rectangular voids surrounded by an insulating grid, and a metallic material deposited into the voids to form a plurality of highly reflective metallic islands. The metallic material can comprise aluminum, gold, or any material forming a high-Schottky barrier with the substrate.

Other objects, features, and advantages of the present invention will become apparent from consideration of the following detailed description and the accompanying drawing.

BRIEF DESCRIPTION OF THE DRAWING

The drawing is a sectional view of a double-Schottky diode light valve according to the present invention.

DETAILED DESCRIPTION

Referring more particularly to the drawings, FIG. 1 illustrates a double-Schottky diode light valve 5 according to the present invention. Light valve 5 allows an incident input beam 110 to modulate an incident read-out beam 120 to produce a polarization modulated output beam 121. As discussed herein, read-out beam 120 enters into and is reflected out of light valve 5, with the reflected portion forming modulated beam 121 which has a different polarization than the incident beam 120.

The central aspect of light valve 5 of the present invention is a double-Schottky diode-based photosubstrate. The substrate comprises a high-resistivity N-type semiconductor substrate 40 disposed between a transparent conductive electrode 30 and a metal matrix structure 60. Both the input side conductor 30 and the read-outside metal matrix 60 form Schottky diodes with the semiconductor substrate 40. The conductor 30 and the substrate 40 form a single Schottky diode (denoted "30/40"), while the metal matrix 60 and the substrate 40 form a matrix of electrically isolated Schottky diodes (denoted "60/40"). The single Schottky diode 30/40 is thus located on the back or input side of substrate 40, while the matrix of electrically isolated Schottky diodes 60/40 is located on the read-out or output side of the substrate 40.

It is the foregoing dual-Schottky diode arrangement which provides the present invention with its advantageous characteristics. In particular, the photosubstrate configuration as set forth above allows for A. C. operation of the light valve, full depletion by opposite polarities while inhibiting minority carrier injection, simple, low-temperature semiconductor processing, visible to visible image conversion and conversion between the infrared and visible spectral ranges.

The double-Schottky configuration results in a significantly higher performance liht valve. In particular, improved output uniformity, higher resolution, and higher yield due to the simplified processing will result. Such a structure will also be compatible with that required for parallel, high throughput processing, and for adaptive optics systems.

Concerning the remaining details of the construction of light valve 5, the input 110 beam enters the device through a transparent base electrode 10, which is substantially transparent to the wavelength of the input beam 110 radiation. Faceplate 10 provides mechanical support and integrity as well as electrical isolation of electrodes 30. Faceplate 10 can comprise several materials known in the art such as an optical quality glass substrate, a fiber optic faceplate on the order of 1 cm. thick or a sapphire faceplate on the order of at least 6 mm. thick.

Photosubstrate 40 comprises a high resistivity semiconductor substrate such as, but not limited to, silicon wafer. A high resistivity silicon wafer preferably has a resistivity in the range of 2-8 kilohm-cm and is approximately 40–120 $\mu$m thick. Other materials, such as gallium arsenide, indium phosphide, or indium arsenide may be used in lieu of silicon in forming the substrate 40 but the following discussion assumes the use of a silicon substrate for clarity in illustration.

In order to form the 30/40 Shottky diode and provide a low resistivity voltage path for one surface of photosubstrate 40, an electrode 30 is deposited on substrate 40. It is also possible to first deposit electrode 30 on faceplate 10 and then mechanically join the combination to substrate 40, however, it is preferred that the Schottky contact be formed directly on substrate 40. Electrode 30 comprises a material such as indium tin oxide (ITO) deposited in a transparent layer in order to allow passage of input beam 110 into the photosubstrate 40. Exemplary electrode 30 layers are indium tin oxide (ITO) approximately 500 Angstroms thick, or a thin (on the order of a few hundred Angstroms) platinum layer followed by approximately 500 Angstroms of ITO. Other metals capable of forming a high Scottky barrier with the N-type substrate 40 such as aluminum or gold can be used instead of platinum. After the deposition of electrode layer 30, faceplate 10 can be attached to the electrode 30 substrate 40 combinations with optical cement 20.

Alternately, the optically transparent electrode 30 can be manufactured in the form of a metal grid pattern. The Schottky barrier grid metal, such as platinum, can be deposited on the surface of substrate 40 in a M×N array of approximately square shape with pixel dimensions (clear of metal) on the order of approximately 8 $\mu$m × 8 $\mu$m, and contacted by the metal grid channels having line widths on the order of 1-2 $\mu$m. The numbers M and N represent the number of pixels (M, N) that can fit across the width (W) and height (H) dimensions of the photosubstrate face. The values of M and N are determined by the dimensions desired for the individual contacts or diodes, which are based on known factors such as the desired sheet conductivity of the back-contact, wavelength of incident radiation to be reflected or transmitted, and manufacturing constraints.

Silicon on sapphire (SOS) technology may also be employed to provide a flat-mounted silicon substrate 40 in the event that a sapphire faceplate 10 is desired. In this case, the Schottky metal electrode 30 will preferably be formed on a sapphire faceplate 10, followed by epitaxial growth of a high resistivity 30–40 $\mu$m thick N-silicon wafer 40. As mentioned herein, the present device can be used to operate in the near-infrared ($\lambda$ less than 5 $\mu$m). For such application the Schottky metal contact 30 will then be thermally treated to form a silicide (e.g., Pt/Si) which is sensitive to infrared radiation. With the SOS approach, there is no need of the optical cement 20 to attach the faceplate 10 to the photoconductive substrate.

After either securing faceplate 10 to photoconductive substrate 40, such as by cement 20, or of the growth of the epitaxial substrate 40, for SOS technology, substrate 40 is thinned down, using known techniques, and polished to provide an optically flat output surface. The readout side Scottky diode layer 60/40 is then fabricated.

First, an insulating layer on the order of 1000-3000 Angstroms thick is deposited or thermally grown on the polished wafer 40 at relatively low temperatures so as not to distort the wafer and adjoining substrate. The suitable insulating material can be materials such as silicon dioxide, other oxides of silicon, silicon nitride or other compounds known to act as insulators in semiconductor work. Since $SiO_2$ is easily manufactured and processed the remaining discussion will employ an oxide layer of $SiO_2$ for ease of illustration.

The thickness of the oxide layer is related to the thickness of the reflective layer required to form a metallic mirror from the diodes 60/40 array. It is well known in the art that different materials have differing reflectivities for a given wavelength of radiation and that they require differing thickness to reflect the same percentage of radiation. There is a basic requirement that the free electron density of the material be sufficient to interact with the radiation and scatter it back out of the material.

For a reflective island 60 comprising metals such as, but not limited to, gold or aluminum, a thickness the order of greater than 0.05 $\mu$m may be sufficient although more than 0.1 $\mu$m is preferred. At the same time, a reflective island 60 comprising metal/semiconductor compounds such as, but not limited to, platinum-silicide, may require 0.1 $\mu$m to 0.2 $\mu$m in order to have sufficient electron densities.

There is no maximum thickness. However, design considerations in terms of the overall mirror and light valve 5 dimensions become determinative. Also, there is obviously no need to waste additional material and processing time once reflection is achieved.

Following the deposition of a photoresist over the oxide, a matrix (grid) pattern is developed and the photoresist is removed from the resulting square island areas 60, leaving only a grid pattern 50. The oxide is next etched in the island area and is left only underneath the photoresist grid. The Schottky barrier forming metal serving also as a metal matrix layer, is next deposited on the grid pattern photoresist. The metal 60 may be formed in two layers, with the first layer serving as the Schottky contact (e.g., platinum) and the second serving as a reflector to enhance the reflectivity of the photoconductive layer.

The metal 60 is deposited directly on the silicon surface at the island area as well as on the photoresist grid areas. Subsequent lift off of the photoresist results in removal of the metal from the oxide area, leaving metal islands 60 on the order of approximately 8 $\mu$m$\times$8 $\mu$m between a grid pattern of oxide barriers 50 having widths of 1-2 $\mu$m.

For readout operation in the visible region, an additional high-resistivity light-blocking layer must also be deposited, either on top, or in lieu of, the oxide insulating layer. Such light-blocking materials are CdTe, GaAs or the multi-layer $Si/SiO_2$ dielectric mirror described in another patent. This insulating light-blocking layer is subjected to the same procedure as described earlier for the insulating oxide (p. 10, paragraphs 1-20). The resulting structure is that of a metal-matrix with insulating, light-blocking channels to prevent the photoactivation of the underlying photosubstrate.

The dimensions of the metal islands 60 can be adjusted according to the overall dimensions of the light valve substrate used and the desired number of individually controlled or activated pixel elements desired. When the islands are used to form a reflective mirror for readout beam 120 there may be a minimum preferred size for adequate reflection. At the same time, it is known that the specific liquid crystal materials or other elements used in light valve 5 determine the number of useful resolution elements that can be utilized. This in turn then determines the minimum dimensions of each element and therefore of islands 60.

The separation of the individual islands must be large enough to provide adequate electrical resistance across the diode array and not short out adjacent pixel or resolution elements. There is also a minimum dimension required for the separation distance between the islands where they function as a reflective mirror. In this case the separation must be less than the wavelength of the radiation to be reflected. Therefore the width of the barriers formed as the grid pattern must be much less than the wavelength of radiation used for readout beam 120.

Following fabrication of the readout side Schottky diode, a liquid crystal alignment layer 70 consisting of material used in the art such as a shallow-angle $SiO_x$ layer (where x ranges from 1 to 2) is next deposited on the metal matrix surface 60 for establishing a predetermined alignment angle.

The remainder of the light valve is constructed as follows. A transparent counterelectrode substrate 140 of glass has deposited onto it a transparent conductive electrode 150 comprising a layer of material such as ITO approximately 100–500 Angstroms thick. A shallow-angle liquid crystal alignment layer 100 of $SiO_x$, on the order of 10–200 Angstroms thick, can then be deposited.

Following the deposition of the liquid crystal alignment layer 100, liquid crystal alignment spacers 75, can be deposited for chemically and electrically isolating the liquid crystal medium from surrounding apparatus and environment. Spacers 75 comprise material such as $SiO_x$ where x ranges from 1 to 2, deposited on the order of 2 to 10 $\mu$m thick. This space also establishes a desired thickness for the liquid crystal material which may otherwise be compressed or flow away. Following the deposition of spacers 75, the liquid crystal 80 is deposited and the device 5 is finally assembled in an air-tight holder as is routinely done with light valves.

Liquid crystal 80 comprises liquid crystal media known in the art such as described in U.S. Pat. No. 3,694,053 issued to F. J. Kahn or in "The Liquid Crystal-Based Visible to IR Dynamic Image Converter (VIDIC)," U. Efron et al, *SPIE Proceedings*, Paper 465-22, Jan. 22–27, 1984. The specific material chosen is dependent upon parameters known in the art such as the operating wavelength, mode of operation and required response or recovery time. Liquid crystal 80 can be operated in the hybrid field effect mode as discussed in U.S. Pat. Nos. 4,378,995, and 4,019,807, mentioned hereinabove. The hybrid field effect configuration is also discussed by Jan Grinberg, et al. in articles published in Vol. 26 of S.P.I.E., page 120 (1980) and in Vol. 14 of Optical Engineering, page 217 (1975). Alternatively, the liquid crystal can be operated also in the pure birefringence mode (zero twist). Operation in this mode can be used for intensity as well as for phase modulation.

To operate the device, a voltage is applied across the light valve 5 by means of an AC source 130. This source 130 is a conventional AC source of the type discussed in the basic light valve patents cited herein. The voltage is typically a symmetric 0.5–1.0 msec square wave voltage waveform having a range of 30–60 volts peak-to-peak.

The operation of the light valve 5 is as follows. In each phase of the square wave, either the front (readout) or backside (input) Schottky diode is reversed biased, while the other is forward biased. For example, a negative voltage applied to the readout (matrix) side diodes reverse-biases those diodes 60/40 while forward biasing the input side diode 30/40. The alternating reverse biasing of the Schottky diodes from each side results in a continuous full depletion of the high resistivity silicon substrate 40 during the complete voltage cycle. The forward biased diode serves to sink the photogenerated majority carriers, while preventing minority carrier injection into the depletion region. It is this property of the Schottky diode, namely, the vanishingly small minority character injection ratio, which forms the basis for this invention.

The electric field associated with the depletion region focuses the photogenerated carriers so as to minimize the resolution losses in the prior art MOS substrates. In contrast, to the prior art MOS substrates, however, the thermally and photogenerated minority carriers will flow back and forth through the light valve 5 and will not accumulate at the insulator/silicon interface, and cause the premature collapse of the depletion region. Likewise, since no accumulation of minority carriers takes place, the formation of an inversion layer is completely eliminated, along with its inherent loss of resolution. The dark current expected from the double-Schottky structure can be maintained below the liquid crystal threshold. Furthermore, with the expected maximum activating current, only a small voltage will be dropped across the liquid crystal. Moreover, since the metallic mirror presents only a negligibly low impedence, full photoactivation will result in only a minimum change in the substrate depletion voltage (of approximately 30-40 volts).

The overall operation of the device is similar to other light valves. The beam 110 activates the photoconductor, causing in return, an activation of the photosubstrate as described herein. The photosubstrate activates the liquid crystal layer 80 in the same manner as the standard silicon light valve as discussed in U.S. Pat. Nos. 4,239,348 and 4,443,064. The input beam 120 enters the light valve 5 through the transparent faceplate 140 and passes through the liquid crystal layer 80 where it is locally modulated by polarization rotation. The input beam 110, which is absorbed by the substrate 40, controls the modulation of the voltage 130 applied across the light valve 5 in order to spatially modulate the beam 120 passing through the liquid crystal layer 80.

After passing through the liquid crystal layer 80, the input beam 120 is reflected by the metallic mirror formed by the array of Schottky diodes 60/40 and is reflected back through the liquid crystal layer 80 where it is further spatially modulated by polarization rotation. Each traversal of the beam 120 through the liquid crystal layer 80 results in approximately 50% of the total polarization rotation in the beam. After reflecting off the metal mirror and passing back through the liquid crystal 80, the polarized and modulated output beam 121 exits the liquid crystal 5. The polarization rotation in the beam may be converted into an output intensity modulation by various means (not shown) known in the art, such as by a wire grid polarizer.

The invention described herein provides a high performance light valve which may be fabricated in a simple manner utilizing primarily low-temperature thin-film processing. The resulting light valve eliminates the problems of the prior art MOS and cadmium sulfide photosubstrates discussed herein. The resulting light valve is suitable for visible to visible image conversion, and can also operate in the infrared region. Moreover, the unique photoconductor of the present invention is not limited to liquid crystal light valves, but may also be applied to light valves employing solid state electro-optic modulators, such as $KD_2PO_4$.

In the foregoing description of the invention, a preferred embodiment of the invention has been described. It is to be understood that other design variations are within the scope of the present invention. Accordingly, the invention is not limited to the particular arrangement which has been illustrated and described herein.

What is claimed is:

1. A photosubstrate for use in light valve devices comprising:
   semiconductor substrate means for absorbing an incident beam of radiation, said absorption producing photogenerated carriers;
   first and second Schottky diode means, alternately reverse-biased, disposed on opposing sides of said substrate means for maintaining said substrate substantially depleted of said carriers, at least one of said Schottky diode means having a plurality of metal islands in a matrix pattern, wherein said second Schottky diode means comprises a plurality of metal islands with insulating channels therebetween oriented to reflect a readout beam of radiation whereby diodes are formed by the interface of asid metal islands and said substrate means.

2. A photosubstrate as defined in claim 1, wherein said substrate means comprises a substrate material chosen from the group of silicon, gallium arsenide, indium arsenide, or indium phosphide.

3. A photosubstrate as defined in claim 1, wherein said metal comprises a metal chosen from the group of indium tin oxide, aluminum, platinum and gold.

4. A photosubstrate as defined in claim 1, wherein said first Schottky diode means comprises a plurality of metal-semiconductor diodes disposed on a first side of said substrate means in optical communication with said incident beam, said diodes including a grid of metal disposed immediately adjacent said substrate means, whereby said diodes are formed by the interface of said grid and said substrate means.

5. A photosubstrate as defined in claim 4, wherein said metallic grid comprises a silicide of platinum and silicon material.

6. A photosubstrate as defined in claim 4, wherein said metallic grid comprises indium tin oxide or platinum.

* * * * *

UNITED STATES PATENT AND TRADEMARK OFFICE
CERTIFICATE OF CORRECTION

PATENT NO. : 4,881,110

DATED : November 14, 1989

INVENTOR(S) : Paul O. Braatz et al.

It is certified that error appears in the above-identified patent and that said Letters Patent is hereby corrected as shown below:

CLAIM 1, column 8, line 16, before "metal islands" delete "asid" and insert therefor --said--.

Signed and Sealed this

Third Day of November, 1992

Attest:

DOUGLAS B. COMER

Attesting Officer

Acting Commissioner of Patents and Trademarks